United States Patent
Blanchard St-Jacques et al.

(10) Patent No.: US 12,512,719 B2
(45) Date of Patent: Dec. 30, 2025

(54) DRAINAGE SYSTEM FOR AN ELECTRIC MOTOR

(71) Applicant: DANA TM4 INC., Boucherville (CA)

(72) Inventors: Benoit Blanchard St-Jacques, Sainte-Julie (CA); Hakim Nechadi, Montreal (CA); Anthony Riendeau, Boucherville (CA)

(73) Assignee: DANA TM4 INC., Boucherville (CA)

( * ) Notice: Subject to any disclaimer, the term of this patent is extended or adjusted under 35 U.S.C. 154(b) by 658 days.

(21) Appl. No.: 17/808,897

(22) Filed: Jun. 24, 2022

(65) Prior Publication Data

US 2023/0421016 A1    Dec. 28, 2023

(51) Int. Cl.
*H02K 5/20*    (2006.01)
*H02K 9/19*    (2006.01)

(52) U.S. Cl.
CPC ............ *H02K 5/203* (2021.01); *H02K 9/19* (2013.01)

(58) Field of Classification Search
CPC ........ H02K 5/203; H02K 9/19; H02K 5/1675; H02K 2213/03
USPC ...................................................... 310/54
See application file for complete search history.

(56) References Cited

U.S. PATENT DOCUMENTS

| | | | |
|---|---|---|---|
| 6,376,949 B1 * | 4/2002 | Hayslett ................ | H02K 5/10 277/408 |
| 2015/0042185 A1 * | 2/2015 | Buttner ................ | H02K 9/193 310/54 |
| 2023/0421016 A1 * | 12/2023 | Blanchard St-Jacques ................ | H02K 5/1675 |

FOREIGN PATENT DOCUMENTS

| | | | | |
|---|---|---|---|---|
| EP | 2795768 B1 | 4/2021 | | |
| WO | 2013091769 A2 | 6/2013 | | |
| WO | 2016095982 A1 | 6/2016 | | |
| WO | WO-2017178597 A1 * | 10/2017 | .......... | F16C 33/6659 |
| WO | 2021064071 A1 | 4/2021 | | |

* cited by examiner

*Primary Examiner* — Ahmed Elnakib
(74) *Attorney, Agent, or Firm* — McCoy Russell LLP

(57) ABSTRACT

Systems and methods for a leak drainage system are herein described. The leak drainage system may be implemented in an electric motor comprising a first region cooled by a liquid, a seal separating the first region from a second region, wherein the liquid does not enter the second region when the seal is not degraded, and a drainage system configured to drain liquid leaking through the seal from the first region into the second region, the drainage system comprising a radially projecting annular lip with a first angled wall positioned on a rotor shaft and an annular depression in a motor static housing circumferentially surrounding the radially projecting annular lip.

17 Claims, 8 Drawing Sheets

DRAINAGE SYSTEM FOR AN ELECTRIC MOTOR

TECHNICAL FIELD

The present description relates generally to a leak drainage system for an electric motor.

BACKGROUND AND SUMMARY

In some electric motor designs, rotating shaft seals may be used to prevent rotor cooling fluid (e.g., a liquid, such as oil or a water-ethylene glycol (WEG) mixture) from flowing into a motor airgap region or active electromagnetic region. When a seal is degraded such that an exterior (e.g., wet) side of the seal (e.g., an exterior of the electric motor) is no longer isolated from an interior (e.g., dry) side of the seal (e.g., an interior of the electric motor), fluid may leak through from the wet side to the dry side of the seal. A leak may result in degradation or malfunction of the electric motor, such as high voltage short circuiting of windings (e.g., for conductive coolant liquid) or undesired changes in electric motor power output due to friction and/or vibration of electric motor components.

In some embodiments of an electric drive system, more than one seal may be used to reduce potential leakage. For example, a first seal and a second seal are positioned, in series, to seal the lubricating medium from the interior of the electric motor. Another example, WO2021/064071A1 (Brushkivskyy et al.), teaches an electric machine having a housing, a rotatable rotor shaft and a leak-conducting device for conducting into a reservoir a leak which occurs at a distance from the rotor shaft and flows away along a contour of the housing of the electric machine in the direction of the rotor shaft. The leak-conducting device may include a wedge-shaped, rectangular-shaped, or trough-shaped recess in the housing. The electric machine may further include a safety device comprising a shoulder on the rotor shaft and a catching structure with a leakage guiding device for guiding a leak from the rotor shaft into the reservoir.

The inventors have recognized drawbacks to motor configurations, such as those described above. In particular, inclusion of a second seal may increase a cost and complexity of the overall electric motor. Further, degradation of the first seal (e.g., resulting in a leak through the first seal) due to vibration, overheating, or other physical degradation may simply result in the second seal being subject to the same degradation. Configuring an electric motor with the radially projecting architecture of Brushkivskyy et al. may include incorporating additional components in the interior of the electric motor, thus increasing a complexity of the electric motor.

To resolve at least a portion of the aforementioned issues, the inventors have developed a drainage system for an electric motor having a rotor shaft seal. The drainage system uses features on existing rotor shaft and motor housing architectures to project fluid (e.g., a liquid, such as oil or a WEG mixture) away from an interior of the electric motor, thus no additional seals or architectures are used to separate the interior and exterior of the electric motor. In one example, the drainage system comprises a rotating shaft with an annular tip extending radially from the rotating shaft and a housing with an annular depression circumferentially surrounding the rotating shaft, such that liquid flowing up a first angled wall of the annular tip is projected at an angle to a first wall of the annular depression, which guides the liquid to a base of the annular depression and along a circumference of the annular depression to exit the annular depression at a drain hole coupled to the annular depression.

The drainage system may be implemented in an electric motor, comprising a first region cooled by a liquid and a seal separating the first region from a second region, wherein the liquid does not enter the second region when the seal is not degraded. The drainage system may be configured to drain liquid leaking through the seal from the first region into the second region. The drainage system may include a radially projecting annular lip with a first angled wall positioned on a rotor shaft and an annular depression in a motor static housing circumferentially surrounding the radially projecting annular lip. A method for directing liquid leaking through a degraded seal may comprise rotating a shaft, driving liquid via an angled, annular projection of the shaft, capturing driven liquid via a channel in a housing of the electric motor, and directing liquid out of the channel via a drain hole. The drainage system may also be used to direct liquid leaking through the seal out of the second region when the shaft is not rotating.

As described herein, the drainage system may drain liquid leaking through the seal when the seal is degraded, such that liquid is directed away from interior components of the electric motor (e.g., positioned in the interior of the electric motor), such as the rotor and the stator. This may allow for continued use of the electric motor when the seal is degraded. Additionally or alternatively, the drainage system may include elements which alert a control system coupled to the drainage system and/or the electric motor of liquid leaking into the interior of the electric motor. The controller may further halt or alter operation of the electric motor until the seal which is degraded is repaired or replaced.

In this way, the drainage system directs liquid leaking through the seal away from the interior of the electric motor, which may reduce further degradation to the electric motor and/or an electric drive system in which the electric motor is arranged, such as a high voltage short circuit in windings. A useable life of the electric motor and electric drive system may thus be prolonged. Additionally, inclusion of the drainage system in the electric motor may allow continued use of the electric motor when the seal is degraded. The drainage system described herein may drain liquid leaking through the seal away from the interior of the electric motor and thus allow nominal use of the electric motor until the seal may be repaired or replaced by a non-degraded seal.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
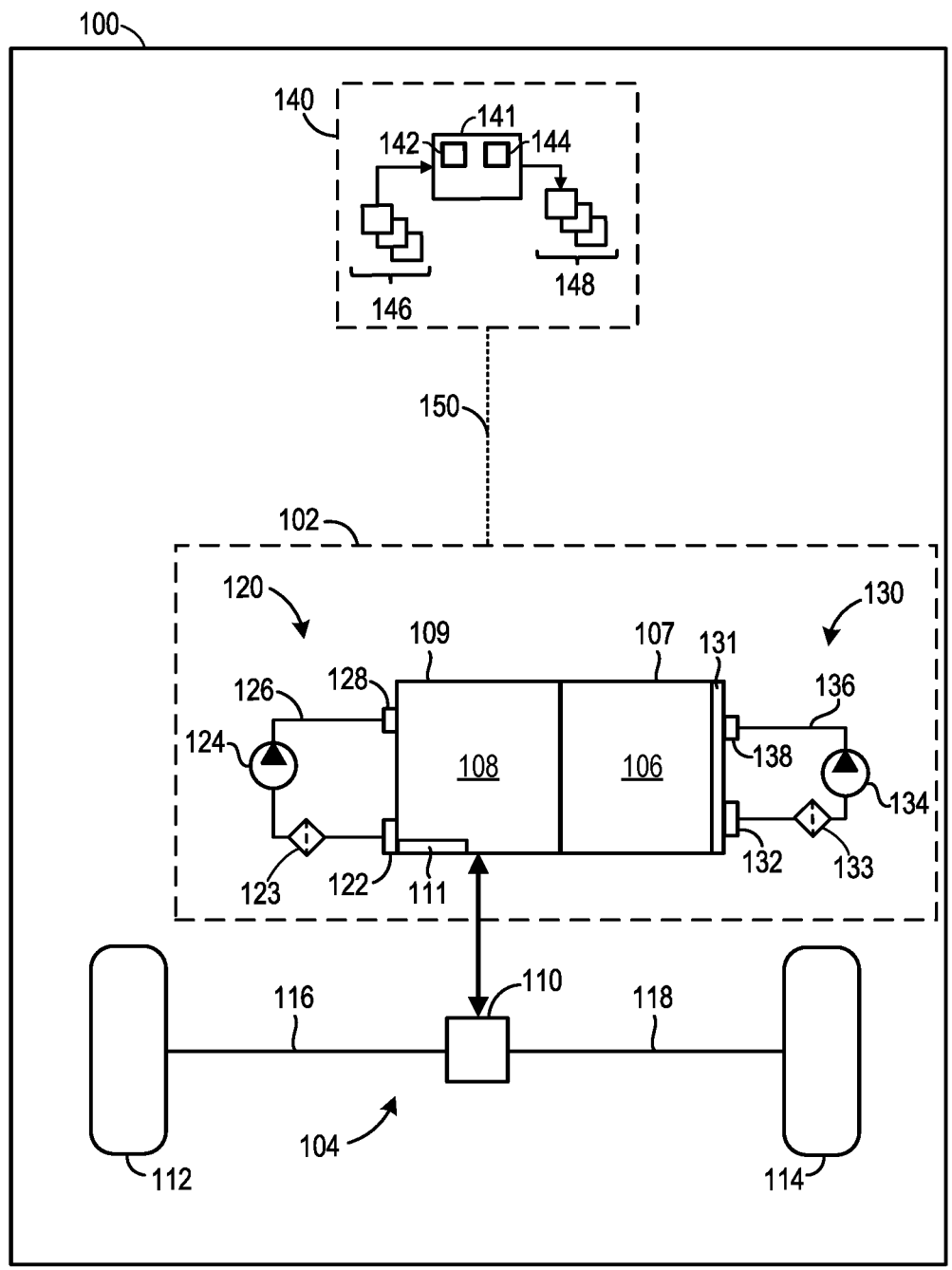
FIG. 1 shows a schematic representation of an electric drive system with lubrication and cooling assemblies.
Figure 2:
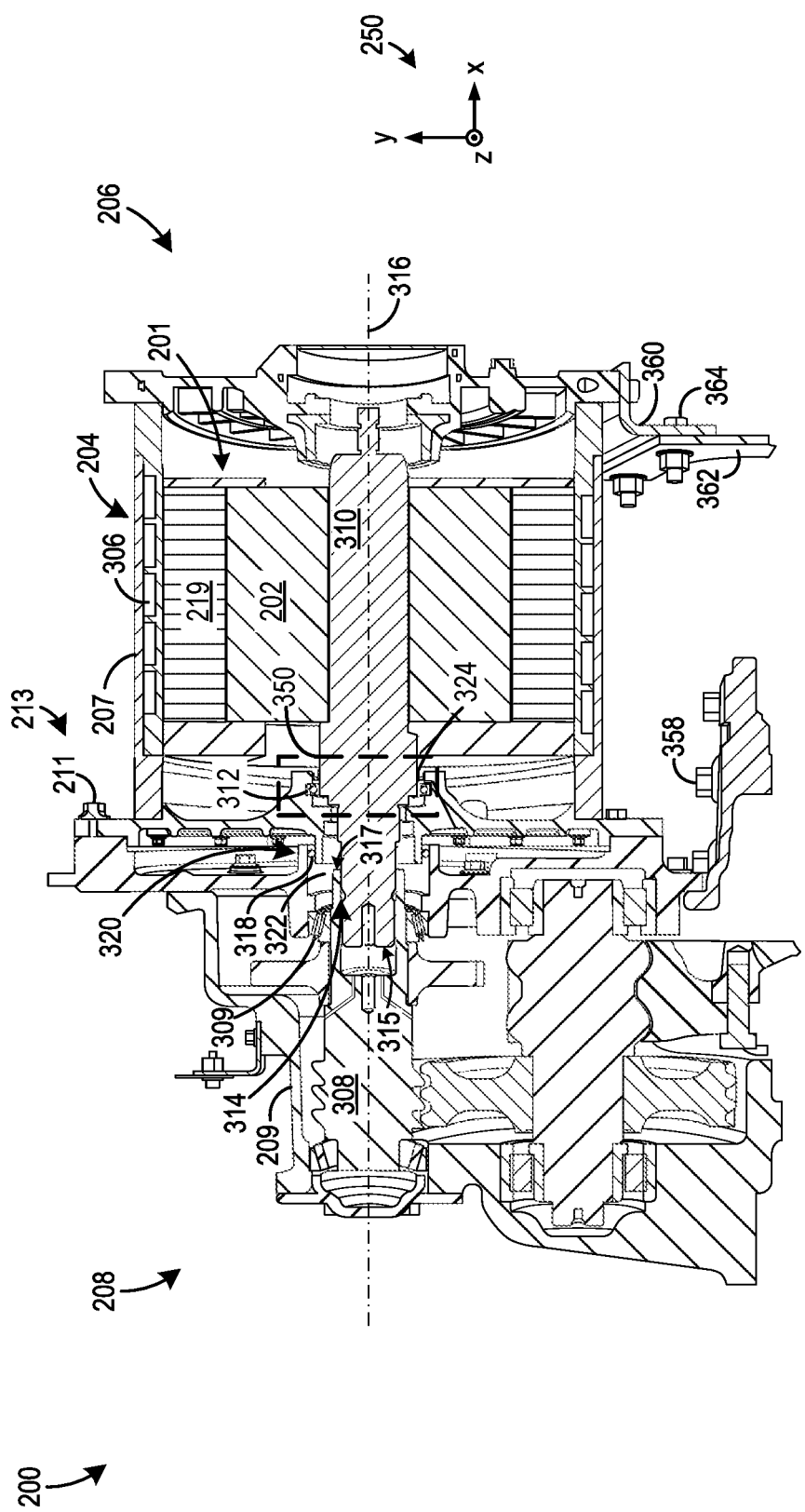
FIG. 2 shows a cross-sectional view of an example embodiment of the electric drive system of FIG. 1, including an electric motor and a gearbox.
Figure 3A:
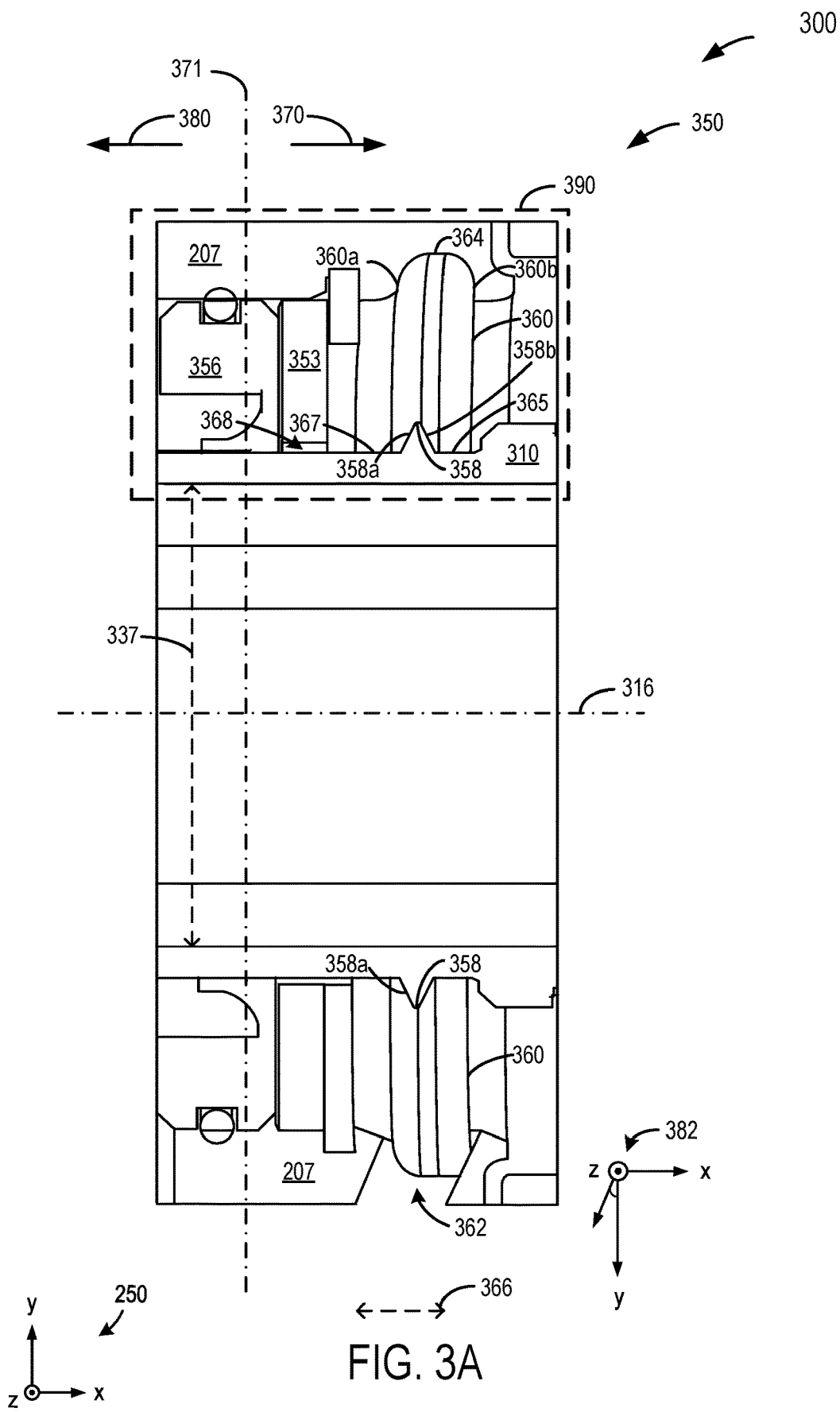
FIG. 3A shows a detailed view of the electric motor cross-section shown in FIG. 2, including a drainage system.
Figure 3B:
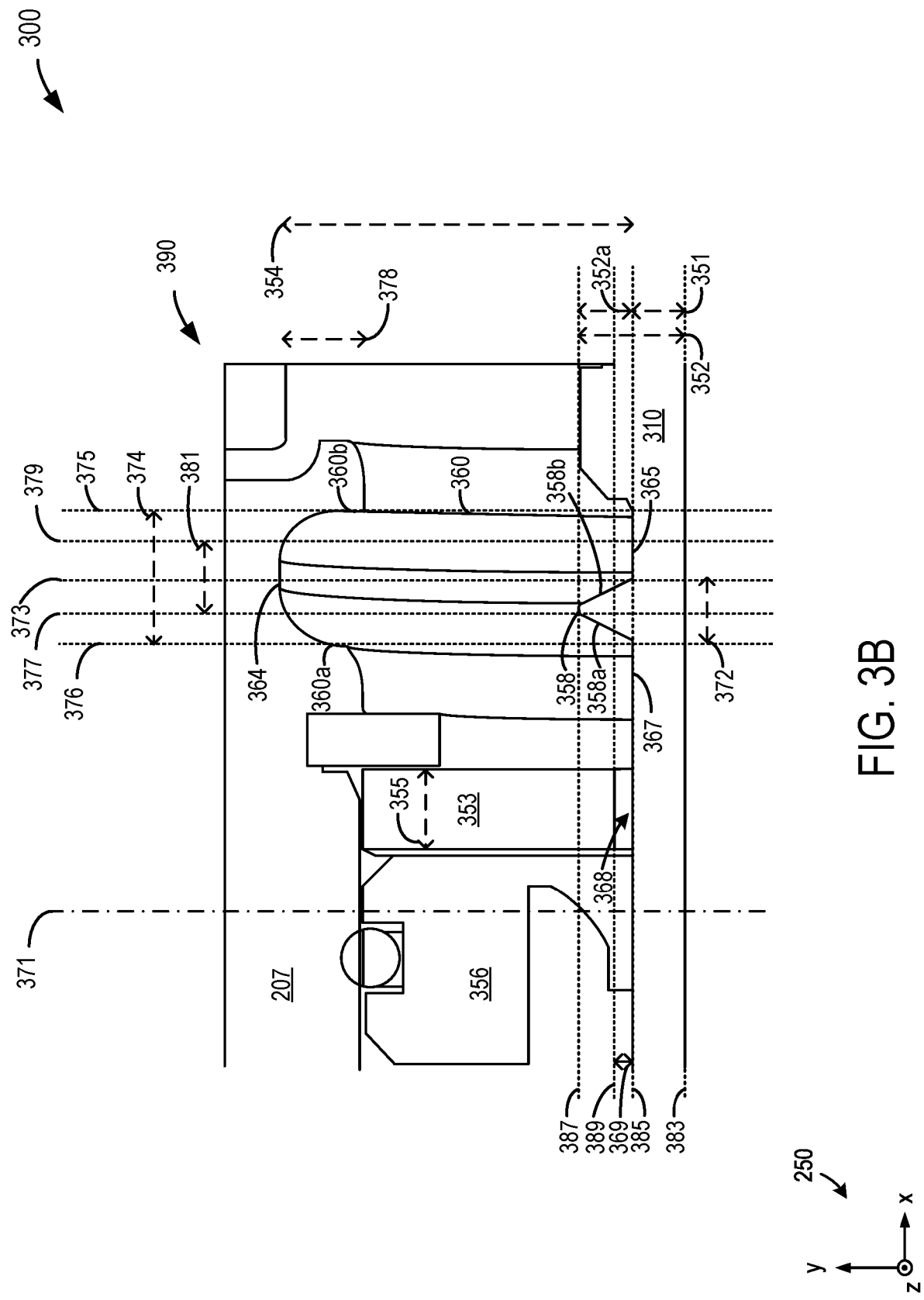
FIG. 3B shows a detailed view of the drainage system of FIG. 3A.
Figure 4A:
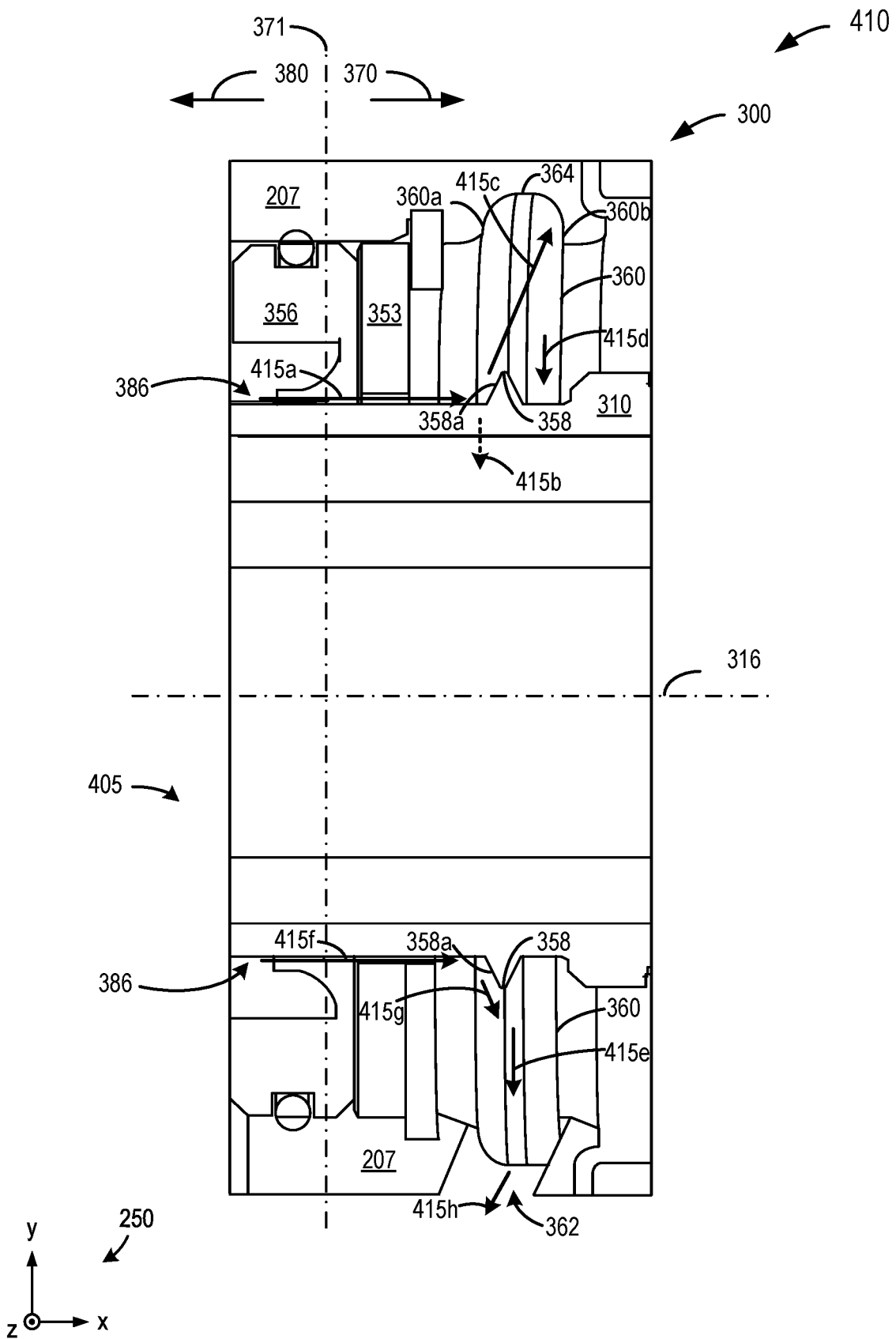
FIGS. 4A-4B illustrate various examples of liquid flow paths which may be formed in the drainage system shown in FIGS. 3A-3B.
Figure 4B:
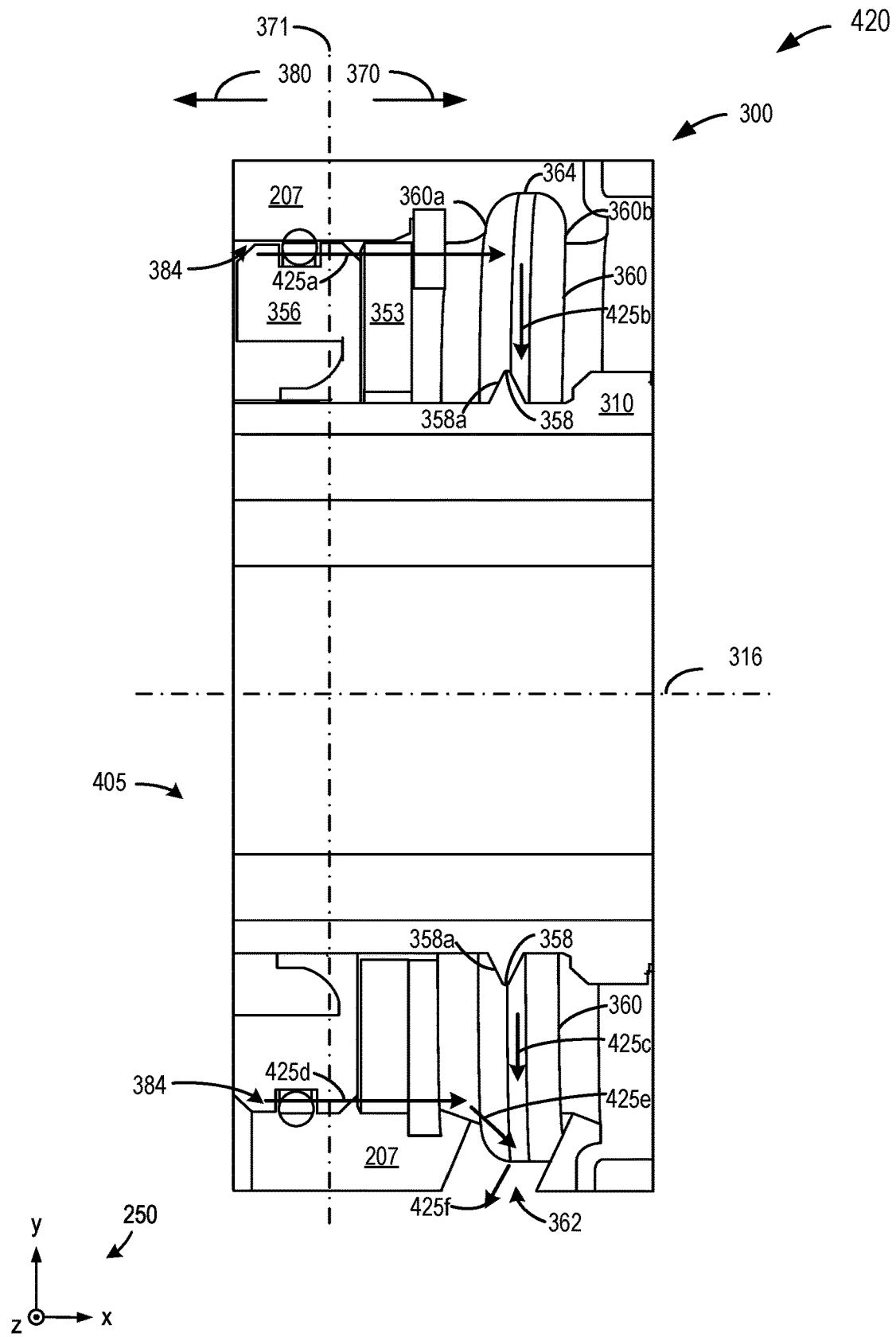
Figure 5:
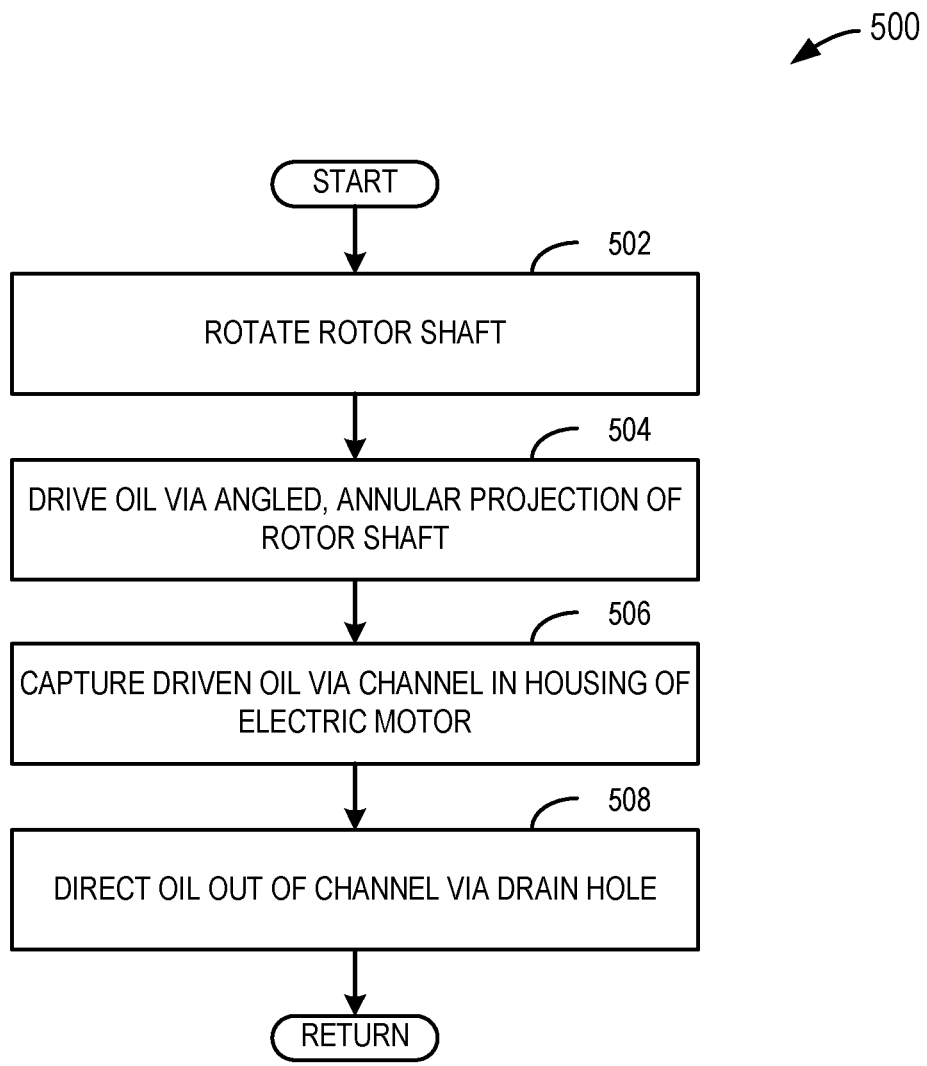
FIG. 5 illustrates a first method for operating the electric drive system of FIG. 1.
Figure 6:
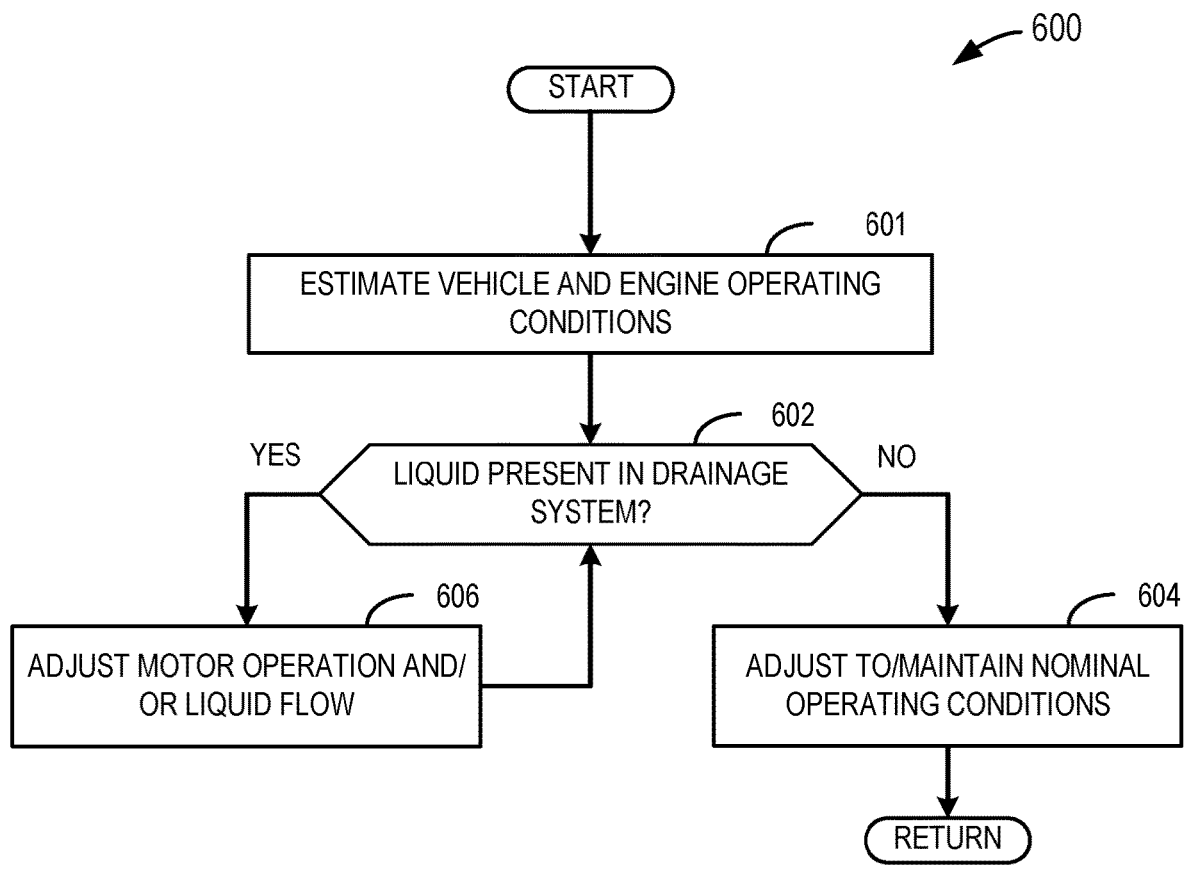
FIG. 6 illustrates a second method for operating the electric drive system of FIG. 1.

The following description relates to a drainage system of an electric drive system, particularly an electric motor. FIG. 1 schematically depicts an electric drive system in a vehicle, which may include an electric machine (e.g., an electric motor) with a housing coupled to a gearbox housing at a housing interface. FIG. 2 shows a cross-sectional view of an electric motor and a gearbox, which may be the electric machine and the gearbox of FIG. 1, respectively. As shown in detail in FIGS. 3A-3B, a drainage system including a radially projecting annular lip and an annular depression may be integrated in the electric motor of FIG. 2 to harvest liquid leaking through a seal separating an interior of the electric motor from an exterior of the electric motor, and direct the liquid away from the interior of the electric motor. FIG. 4A shows a first liquid flow path, where liquid leaking through an inner diameter between the seal and a rotor shaft may build up between the radially projecting annular lip and the seal, is projected to the annular depression, and is directed towards a drain hole. FIG. 4B shows a second liquid flow path, where liquid leaking through the seal at a static region between the seal and a motor housing is harvested by the annular depression and directed towards the drain hole. FIG. 5 illustrates a first method for operating the electric drive system of FIG. 1, which may include capturing liquid leaking through the seal using the drainage system of FIGS. 3A-4B. FIG. 6 illustrates a second method for operating the electric drive system of FIG. 1, which may include adjusting at least one of electric motor operation and liquid flow based on detection of liquid in the drainage system of FIGS. 3A-4B. FIGS. 2-4B are drawn approximately to scale. However, other relative component dimensions may be used, in other embodiments.

In this way, liquid leaking through a degraded seal may be harvested and directed away from the interior of the electric motor both when the rotor shaft is rotating and/or is stationary. As the radially projecting annular lip is an integrated part of the rotor shaft and the annular depression is a recession in the motor static housing, modifications to existing components are made to direct fluid flow without inclusion of additional components, thus reducing a complexity of the system. Liquid leaking through the seal may flow along either of the first liquid flow path or the second liquid flow path both when the rotor shaft is rotating and is stationary, depending on a location of the leak. Further degradation of the electric motor and/or an electric drive system in which the electric motor is arranged may be reduced and a useable life of the electric motor and electric drive system may be prolonged.

FIG. 1 schematically illustrates an electric vehicle 100 with an electric drive system 102 that provides power to and/or is incorporated into an axle assembly 104 vehicle 100. The vehicle 100 may take a variety of forms in different examples, such as a light, medium, or heavy duty vehicle. Additionally, the electric drive system 102 may be adapted for use in front and/or rear axles, as well as steerable and non-steerable axles. To generate power, the electric drive system 102 may include an electric machine 106. In some examples, the electric machine 106 may be an electric motor-generator and may thus include conventional components such as a rotor, a stator, and the like housed within an electric machine housing 107 for generating mechanical power as well as electric power during a regenerative mode, in some cases. Further, in other examples, the vehicle 100 may include an additional motive power source, such as an internal combustion engine (ICE) (e.g., a spark and/or compression ignition engine), for providing power to another axle. As such, the electric drive system 102 may be utilized in an electric vehicle (EV), such as a hybrid electric vehicle (HEV) or a battery electric vehicle (BEV).

In some examples, the electric machine housing may be coupled (e.g., via bolts) to a housing of a gearbox. Further, the electric machine may provide mechanical power to a differential via the gearbox. From the differential 110, mechanical power may be transferred to drive wheels 112, 114 by way of axle shafts 116, 118, respectively, of the axle assembly 104. As such, the differential 110 may distribute torque, received from the electric machine 106 via the gearbox 108, to the drive wheels 112, 114 of the axle shafts 116, 118, respectively, during certain operating conditions. In some examples, the differential 110 may be a locking differential, an electronically controlled limited slip differential, or a torque vectoring differential.

The gearbox 108 may be a single-speed gearbox, where the gearbox operates in one gear ratio. However, other gearbox arrangements have been envisioned such as a multi-speed gearbox that is designed to operate in multiple distinct gear ratios. Further, in one example, the electric machine 106, the gearbox 108, and the differential 110 may be incorporated into the axle assembly104, forming an electric axle (e-axle) in the vehicle 100. The e-axle, among other functions, for provides motive power to the drive wheels 112, 114 during operation. Specifically, in the e-axle embodiment, the electric machine and gearbox assembly may be coupled to and/or otherwise supported by an axle housing. In one particular example, the e-axle may be an electric beam axle where a solid piece of material (e.g., a beam, a shaft, and/or a housing) extends between the drive wheels. The e-axle may provide a compact arrangement for delivering power directly to the axle. In other examples, however, the electric machine 106 and the gearbox 108 may be included in an electric transmission in which the gearbox and/or electric motor are spaced away from the axle. For instance, in the electric transmission example, mechanical components such as a driveshaft, joints (e.g., universal joints), and the like may provide a rotational connection between the electric transmission and the drive axle.

The electric drive system 102 may further include an oil circuit 120 for circulating oil (e.g., natural and/or synthetic oil) through the gearbox housing 109 to lubricate and/or cool various system components. The oil circuit 120 may include a filter 123 and an oil pump 124 that draws oil from an oil reservoir 111 (e.g., a sump) in the gearbox housing 109, via an outlet 122, and drives a pressurized oil flow through a delivery line 126 to an inlet 128 of the gearbox housing 109. In some examples, the oil pump 124 may be provided at an exterior portion of the gearbox housing 109. However, in other examples, the oil pump may be included within the gearbox housing 109. Various distribution components and arrangements (e.g., nozzles, valves, jets, oil passages, and the like) of the oil circuit 120 may be included within the electric drive system 102 in order to facilitate routing of the oil within the gearbox housing 109 and, in one particular example, to a portion of the electric machine housing 107. In some case, the oil circuit 120 may be used for routing oil to various gearbox shafts and gears as well as a rotor shaft bearing of the electric machine, thereby providing an efficient system for effectively using the gearbox oil to cool said bearing.

The electric drive system 102 may further include a coolant circuit 130 that circulates coolant (e.g., water and/or glycol) through a water jacket 131 formed in the electric machine housing 107. The coolant circuit 130 may include a coolant inlet 138 and a coolant outlet 132 positioned on (or in) the electric machine housing 107. The coolant circuit 130 may further include a filter 133 and a pump 134 that circulates coolant from the coolant outlet 132 to the coolant inlet 138 via a coolant delivery line 136. From the coolant inlet 138, the coolant travels into the water jacket 131 formed in the electric machine housing 107 which removes heat from components of the electric machine 106. In some examples, the coolant circuit 130 may further include a heat exchanger (e.g., radiator) which removes heat from the coolant that exits the electric machine housing 107 by way of the coolant outlet 132.

The vehicle 100 may also include a control system 140 with a controller 141. The controller 141 may include a processor 142 and a memory 144. The memory may be non-transitory memory and may hold instructions stored therein that when executed by the processor cause the controller 141 to perform various methods, control techniques, and the like described herein. The processor 142 may include a microprocessor unit and/or other types of circuits. The memory 144 may include known data storage mediums such as random access memory, read only memory, keep alive memory, combinations thereof, and the like. The controller 141 may receive various signals from sensors 146 positioned in different locations in the vehicle 100 and electric drive system 102. The controller 141 may also send control signals to various actuators 148 coupled at different locations in the vehicle 100 and electric drive system 102. For instance, the controller 141 may send command signals to the oil pump 124 and/or the pump 134 and, in response, the actuator(s) in the pump(s) may be adjusted to alter the flowrate of the oil and/or coolant delivered therefrom. The control system 140 and the electric drive system 102 may thus be communicatively coupled, as is indicated by the dotted line 150. In other examples, the controller may send control signals to the electric machine 106 and, responsive to receiving the command signals, the electric machine may be adjusted to alter a rotor speed. The other controllable components in the system may be operated in a similar manner with regard to sensor signals and actuator adjustment.

FIG. 2 depicts a cross-sectional view of a portion of an electric drive system 200, which may be an embodiment of the electric drive system 102 of FIG. 1. An axis system 250 is provided in FIG. 2, as well as FIGS. 3-4B, for reference. The y-axis may be a vertical axis (e.g., parallel to a gravitational axis), the x-axis may be a lateral axis (e.g., horizontal axis), and the z-axis may be a longitudinal axis, in one example. However, the axes may have other orientations, in other examples.

The electric drive system 200 may include an electric machine 206 and a gearbox 208. The electric machine 206 may include a stator 219 and a rotor 202 enclosed in a working chamber 201 of an electric machine housing 207. The electric drive system 200 may further include an oil circuit and a coolant circuit that cool and/or lubricate electric machine and/or gearbox components, which may share similarities with the oil circuit 120 and the coolant circuit 130, respectively, depicted in FIG. 1. The electric machine housing 207 includes a water jacket 204 formed therein with coolant channels 306, which is included in the coolant circuit. The coolant channels 306 may receive coolant from upstream components in the coolant circuit, via an inlet (not shown) formed in the electric machine housing 207, as previously discussed with regard to the coolant circuit 130 of FIG. 1. The coolant circulating through the water jacket 204 may function to remove heat from the stator, rotor, and bearings of the electric machine 206.

The rotor 202 is designed to electromagnetically interact with the stator 219 to provide torque to a gearbox shaft 308 (e.g., a gearbox input shaft) via a rotor shaft 310. The rotor shaft 310 may be supported for rotation in the electric machine housing 207 by bearings positioned at outboard and inboard ends thereof. In the frame of reference depicted in FIG. 2, the inboard and outboard ends of the rotor shaft are the right and left ends, respectively. The gearbox shaft 308 may be supported for rotation in the gearbox housing 209 by a gearbox shaft bearing 309. As such, the gearbox shaft bearing 309 is positioned on the gearbox shaft 308.

In one example, as illustrated in FIG. 2, the electric machine housing 207 of the electric machine 106 may be coupled to the gearbox housing 209 of the gearbox 208 by way of bolts 211. For instance, an inboard side 213 of the gearbox may be coupled to the motor housing. Further, the gearbox shaft 308 may be coupled for rotation with the rotor shaft 310, such that a shaft interface 314 is formed therebetween within the gearbox housing 209. Specifically, the shaft interface 314 is formed between an outboard end 315 of the rotor shaft 310 and an inboard end 317 of the gearbox shaft 308. The rotor shaft 310 and the gearbox shaft 308 are coaxially disposed and therefore have a common rotational axis 316.

In some examples, a housing seal 318 may be disposed between the electric machine housing 207 and the gearbox housing 209. More specifically, the housing seal 318 may be disposed at a housing interface 320 (between the electric machine housing 207 and the gearbox housing 209) in the vicinity of the shaft interface 314. Further, the housing seal 318 may form a portion of a boundary of a sealed cavity 322. Oil may be introduced into the sealed cavity 322 through oil passages in the shaft interface 314 and from the sealed cavity oil flows to a front rotor shaft bearing 312. Other boundaries of the sealed cavity 322 may include a portion of an interior surface of the gearbox housing 209 and a portion of an interior surface of the electric machine housing 207, a portion of an outer surface of the gearbox shaft 308, and/or a portion of an outer surface of the rotor shaft 310. In one example, the sealed cavity 322 may be bounded by a rotor shaft seal 324 positioned on an inboard side of the front rotor shaft bearing 312. Further details of the rotor shaft seal 324 are expanded upon with reference to FIGS. 3-4B.

The rotor shaft seal may degrade over time and/or due to vibration, overheating, or other physical degradation. Degradation of the rotor shaft seal may allow liquid, such as oil and/or a WEG mixture, to leak through the rotor shaft seal and enter an interior of the electric motor. In the absence of liquid leaking through the rotor shaft seal, the interior of the electric motor may be kept dry (e.g., free of liquids). Maintaining the interior of the electric motor dry may increase a performance and durability of the electric motor as presence of liquids/moisture in the interior of the electric motor may interfere with the electromagnetic interaction of the rotor and stator and thus degrade function of the electric machine (e.g., the electric motor). When liquid enters the interior of the electric motor, such as due to degradation of the rotor shaft seal, presence of the liquid may cause mechanical interference in a motor airgap region or active electromagnetic region, thereby increasing friction, power losses, heating, and/or vibration, relative to when no liquid is present in the interior of the electric motor.

A system and method will now be described for capturing and/or redirecting liquid leaking through a degraded seal. The system, herein described with respect to the electric motor described in FIGS. 1-2, includes a drainage system having a radially projecting annular lip positioned on the rotor shaft and an annular depression on a motor static housing (e.g., the electric motor housing), the annular depression having a drain hole. FIGS. 3A-3B shows a detailed view of the electric motor cross-section shown in FIG. 2, including the drainage system.

FIG. 3A illustrates a detailed view of a portion of the electric motor cross-section of FIG. 2, as outlined by a first dashed line box 350 shown in FIG. 2. FIG. 3B shows a detailed view of a portion of the drainage system of FIG. 3A, as outlined by a second dashed line box 390. FIGS. 3A-3B are herein described concurrently. Some elements shown in FIG. 2 may be excluded from FIGS. 3A-3B for simplicity, while elements of FIG. 2 which are included in FIGS. 3A-3B are similarly numbered. The axis system 250 is provided in FIGS. 3A-3B for reference and comparison to FIGS. 2 and 4A-4B. The rotational axis 316 is further included in FIGS. 3A-3B and may be referred to as the rotor axis.

The detailed views of FIGS. 3A-3B show a drainage system 300 for the electric motor, which includes a radially projecting annular lip 358, an annular depression 360, and a drain hole 362. A seal 356, which may be the rotor shaft seal 324 of FIG. 2, may fluidically separate a first region of the electric motor from a second region of the electric motor when the seal 356 is intact (e.g., not degraded), as shown by a first dashed line 371. The seal 356, the annular lip 358, the annular depression 360, and a retaining plate 353 on which the seal 356 is mounted, extend radially from, and are rotationally symmetrical about, the common rotational axis 316. The drain hole 362 is present at a bottom portion of the annular depression 360, with reference to the y-axis. In other embodiments, such as when the electric motor may be differently oriented with respect to the axis system 250, the drain hole 362 may be positioned such that liquid captured by the drainage system 300 may be directed out of the drain hole 362 with respect to a direction of gravity, as further described with respect to FIGS. 4A-5.

When the seal 356 is degraded, such as due to heating, vibration, or other degradation as described above, liquid may undesirably leak through the seal 356 from the second region into the first region. The drainage system 300, as described herein, may be positioned in the first region of the electric motor. Thus, the drainage system 300 may capture and direct liquid leaking through the seal 356 out of the first region of the electric motor using the radially projecting annular lip 358, the annular depression 360, and the drain hole 362.

The first region, herein referred to as an interior 370 (e.g., an interior of the electric motor), may include a stator and a rotor, such as the stator 219 and the rotor 202 of FIG. 2, and other components of the electric motor which may be degraded if made wet (e.g., by liquid, such as oil, a WEG mixture, or other lubricant). The second region, herein referred to as an exterior 380 (e.g., an exterior of the electric motor), may include components for which lubrication is desired. The seal 356 may be positioned on the retaining plate 353, which may not fluidically seal (e.g., separate) the interior 370 of the electric motor from the exterior 380 of the electric motor. For example, the retaining plate 353 may be a ring radially surrounding the rotor shaft 310, where the retaining plate 353 positions the seal 356 in place, and the retaining plate 353 may not be in contact with the rotor shaft 310. In other words, there may be a gap 368 having a gap width 369 between the ring shape of the retaining plate 353 and the rotor shaft 310, such that liquid leaking through the seal 356 when the seal 356 is degraded may flow axially through a ring width 355 of the retaining plate 353 (e.g., in the gap 368 between the retaining plate 353 and the rotor shaft 310). The gap 368 may extend between a tenth dashed line 389 and an eighth dashed line 385, as shown in FIG. 3B. In another embodiment, the gap 368 may be between the ring shape of the retaining plate 353 and the electric machine housing 207. Further, there may be a gap between both the retaining plate 353 and the electric machine housing 207 and between the retaining plate 353 and the rotor shaft 310. Thus, when the seal 356 is degraded, liquid may undesirably leak from the exterior 380 of the electric motor into the interior 370 of the electric motor.

The radially projecting annular lip 358 is herein referred to as the annular lip 358, and may also be referred to as an annular tip and/or an angled annular projection of the rotor shaft. The annular lip 358 may be formed as part of the rotor shaft 310. For example, the rotor shaft 310 may be fabricated or otherwise machined as a conventional rotor shaft with the annular lip 358 extending around the circumference of the rotor shaft. Alternatively, the annular lip 358 may be machined separately from the rotor shaft and welded or otherwise coupled to the rotor shaft. The annular lip 358 may be formed of the same material which forms the rotor shaft 310, for example, a metal such as steel. In another embodiment, the annular lip 358 may be formed of a different material than the material which forms the rotor shaft 310. For example, the annular lip 358 may be formed of a polymer, whereas the rotor shaft 310 may be formed of a metal, such as steel. As the annular lip 358 is coupled to the rotor shaft 310, the annular lip 358 rotates as the rotor shaft 310 rotates.

The annular lip 358 projects from the rotor shaft 310 radially towards the annular depression 360. In one embodiment, the annular lip 358 is formed of a first angled wall 358a and a second angled wall 358b which intersect to form a triangular tip. The first angled wall 358a may form a less than 90-degree angle with the rotor shaft 310, with respect to the y-axis. The annular lip 358, formed by the first angled wall 358a and the second angled wall 358b, may have a first width 372 at the rotor shaft 310. The first width 372 may extend between a second dashed line 376 (e.g., a vertical axis perpendicular to the axis of rotation of the rotor shaft) and a third dashed line 373, as shown in FIG. 3B. In another embodiment, the annular lip 358 may have a first wall and a second wall which intersect to form a sharp tip, where the first wall and the second wall may form a shape other than a triangle. For example, the first wall and the second wall may be concave slopes which intersect to form the sharp tip. The concave slope of the first wall may guide liquid leaking through the seal 356 towards the sharp tip, where liquid builds up and is projected to the annular depression 360. Other embodiments of the annular lip 358 may be possible wherein a wall is used to guide liquid towards a sharp tip, where the liquid builds up and may form droplets which are projected to the annular depression 360.

The annular lip 358 may increase a diameter of a surface of the rotor shaft 310 at the annular lip 358. The surface of the rotor shaft 310 may circumferentially surround a shaft of the rotor shaft 310, which has a shaft diameter 337. The shaft and the surface of the rotor shaft 310 may be a single unit and are described separately herein for illustrative purposes. For example, a first region 365 of the surface of the rotor shaft 310 to a left side of the annular lip 358 and a second region 367 of the surface of the rotor shaft to the right of the annular lip 358 may have a first diameter 351, and the surface of the rotor shaft 310 at the annular lip 358 (e.g., at a center of the first width 372) may have a second diameter 352. The first diameter 351 may be less than the second diameter 352. For example, the first diameter 351 may be approximately half of the second diameter 352. A height 352a of the annular lip 358 may be a difference between the second diameter 352 and the first diameter 351. The first diameter 351 may extend between a seventh dashed line 383 and the eighth dashed line 385, the height 352a may extend between the eighth dashed line 385 and a ninth dashed line 387, and the second diameter 352 may extend between the seventh dashed line 383 and the ninth dashed line 387, as shown in FIG. 3B.

The annular depression 360 extends around an inner circumference of the electric machine housing 207 and may be configured to guide liquid circumferentially around, and a distance from, the rotor shaft 310 to the drain hole 362, as further described herein. For example, the annular depression 360 is machined into the electric machine housing 207 as a uniform concave channel extending radially around the electric machine housing 207 in radial alignment with the annular lip 358. The concave channel may be semi-circular with a base 364 curvedly coupled to and positioned between a first wall 360a and a second wall 360b. The base 364 may be a flat (e.g., not curved) region between the first wall 360a and the second wall 360b, in some of a plurality of embodiments. In other embodiments, the base may curvedly couple the first wall 360a and the second wall 360b. In further embodiments, the annular depression 360 may have a triangular shape such that the first wall 360a and the second wall 360b intersect at a point to form the concave channel. The annular depression 360 may have a shape other than triangular, curved, or having a flat base, so long as the annular depression 360 is a concave channel extending around the inner circumference of the electric machine housing 207. A base width 381 may be less than a second width 374 of the annular depression 360, where the base width 381 extends between a fourth dashed line 377 and a fifth dashed line 379, as shown in FIG. 3B.

The second width 374 of the annular depression 360 may be based on an expected angle of the electric motor (e.g., an angle at which the electric motor is mounted in the vehicle), such that liquid captured by the annular depression 360 may drip from the annular lip 358 into the annular depression 360 (e.g., be captured by the second width 374) and not drip onto the electric machine housing 207 on either axial side of the second width 374. In the embodiment described with respect to FIGS. 3A-4B, the electric motor may be mounted in the vehicle such that the rotor shaft 310 is perpendicular to a direction of gravity. In other words, the common rotational axis 316 and the x-axis of the axis system 250 are perpendicular to the direction of gravity, and the y-axis of the axis system 250 and the first dashed line 371 are parallel to the direction of gravity. The second width 374 may extend between the second dashed line 376 and a sixth dashed line 375, as shown in FIG. 3B.

The first wall 360a may be curvedly coupled to the electric machine housing 207 and the second wall 360b may be coupled to the electric machine housing 207 at approximately a right angle. Alternatively, the annular depression 360 may have a different cross-sectional configuration, such as a rectangular, triangular, or other uniform concave channel which circumferentially surrounds the annular lip 358 and is configured to capture liquid leaking through the seal 356 and direct liquid out of the interior 370 of the electric motor, as further described herein. The annular depression 360 of the electric machine housing 207 remains static both when the rotor shaft 310 is rotating and is stationary.

The first width 372 of the annular lip 358 may be less than the second width 374 of the annular depression 360. For example, the first width 372 may be approximately half of the second width 374. When the first width 372 is less than (e.g., approximately half of) the second width 374, liquid projected by the annular lip 358 (e.g., along the first angled wall 358a) may be caught by the second wall 360b of the annular depression 360, as further described herein. The annular lip 358 may have a first corner (e.g., a left corner) where the first angled wall 358a intersects with the rotor shaft 310. The first corner of the annular lip 358 may be in radial alignment along rotational axis 316 (e.g., same x-axis) with a second edge (e.g., a second left edge) of the annular depression 360, as shown by the second dashed line 376. The second edge of the annular depression 360 may be the curved intersection of the first wall 360a and the electric machine housing 207, as described above. Thus, the annular depression 360 and the annular lip 358 may be equidistant (along the x-axis) from the seal 356. In another embodiment, the annular lip 358 and the annular depression 360 may not be in radial alignment (axial alignment along the x-axis). For example, the annular lip 358 and the annular depression 360 may be offset such that the first corner of the annular lip 358 is radially closer to the seal 356 than the second edge of the annular depression 360. The first corner of the annular lip 358 and the seal 356 may be spaced apart by a distance which allows liquid leaking through the seal 356 to be captured by the annular depression 360. The distance may allow for additional components, such as the retaining plate 353 on which the seal 356 is mounted, to be positioned in the interior 370 of the electric motor between the seal 356 and the annular depression 360. The annular depression 360 may capture liquid projected onto the electric machine housing 207 by the annular lip 358, as further described in FIGS. 4A-5.

The annular depression 360 may have a first depth 378. In other words, the annular depression 360 may radially extend the first depth 378 into the electric machine housing 207. The first depth 378 may be based on an expected angle of the electric motor, similarly to the second width 374, such that such that liquid captured by the annular depression 360 may drip from the annular lip 358 into the annular depression 360 (e.g., be captured by the first depth 378) and not overflow beyond the first depth 378. The height 352a of the annular lip 358 may be less than a distance 354 between the rotor shaft 310 and a base 364 of the annular depression 360. In other words, there may be a gap between the annular lip 358 and the annular depression 360 which may be filled by liquid, such as oil, a WEG mixture, other lubricant, and/or air. For example, the distance 354 may be approximately four times the height 352a of the annular lip 358, which may allow for liquid to be projected by the annular lip 358 into the annular depression 360 with negligible splash of liquid onto the rotor shaft 310 or other elements positioned in the interior 370 of the electric motor for which lubrication is not desired. The distance 354 may be a non-zero distance which is greater than or less than four times the height 352a, and allow for sufficient projection and catching of liquid by the annular lip 358 and annular depression 360, respectively. For example, the distance 354 may be different for different electric machine designs or applications. Additionally, the distance 354 may allow for capturing of liquid leaking through the seal 356 when the rotor shaft 310 is stationary (e.g., not rotating), as liquid may flow along a circumference of the rotor shaft 310 in a direction of gravity and drop off of the rotor shaft 310 and be caught by the annular depression 360.

The annular depression may further include the drain hole 362 at a lowest point of the annular depression 360 with respect to the y-axis. The drain hole 362 may extend into the electric machine housing 207. For example, the drain hole 362 may be a channel through the electric machine housing 207 of the electric motor and may be coupled to a liquid overflow container (not shown) or otherwise coupled to the exterior of the electric motor. The drain hole may have a third width 366. The third width 366 may be greater than, less than, or equal to the second width 374 of the annular depression 360. In this way, liquid captured by the annular depression 360 and directed along the annular depression 360 in a direction of gravity may be funneled into the drain hole 362, which may then direct liquid out of the interior 370 of the electric motor. The drain hole 362 may be a circular, rectangular, triangular, square, or other configuration of channel which extends through the electric machine housing 207. As opposed to the annular depression 360, which may be configured as a semi-circular concave channel in the electric machine housing 207, the drain hole 362 may be configured as a cylindrical or other shaped channel where the electric machine housing 207 forms walls of the drain hole 362 through which liquid flows. The drain hole 362 may be positioned at an angle 382 from the y-axis, which may direct liquid collected by the annular depression 360 out of the annular depression 360 and through the drain hole 362 to the liquid overflow container or exterior of the electric motor. The angle 382 may be a less than 90-degree angle with respect to the y-axis. The angle 382 may have a different value (e.g., the drain hole 362 may be positioned at a different angle than the angle 382) which allows for sufficient drainage of liquid captured by the annular depression 360. In this way, the drain hole 362 may direct liquid away from other components positioned in the interior 370 of the electric motor. The drain hole 362 may direct liquid into a reservoir (not pictured), from which the liquid may be used to lubricate and/or cool other systems of the vehicle.

The embodiment of the drainage system 300 shown in FIGS. 3A-3B includes a single drain hole 362, however other embodiments of the drainage system 300 may include more than one drain hole, where each drain hole similarly couples the annular depression 360 to the liquid overflow container or exterior of the electric motor, as further described herein. Inclusion of more than one drain hole may allow for different angular positioning of the electric motor in the vehicle without compromising an ability of the drainage system 300 to capture and drain liquid out of the interior 370 of the electric motor. For example, the electric motor configured with the drainage system 300 may be differently positioned (e.g., perpendicular to the direction of gravity, as described with respect to FIGS. 3A-3B, or offset from perpendicular to the direction of gravity) in different vehicle makes and/or models. Therefore, configuring the drainage system with more than one drain hole may allow drainage of captured liquid regardless of angular position of the electric motor. Additionally, the third width 366 of the drain hole 362 (and equivalent, additional drain holes) may be sized such that liquid captured by the annular depression 360 may be sufficiently drained by the drain hole at different angular positions of the electric motor.

In some embodiments, a sensor (not shown) for detecting a presence of liquid may be positioned in at least one of the annular depression 360, the drain hole 362, and/or the reservoir. Different types of sensors may be used depending on which element the sensor is positioned in; for example, the sensor in the reservoir may comprise a float connected to a variable resistor. Other sensor types may include a temperature sensor, a pressure sensor, and other types of sensors which may detect a presence or absence of liquid. When the seal 356 is degraded and liquid leaks through the seal 356 into the interior 370 of the electric motor, the sensor may detect the presence of liquid in the interior 370 of the electric motor and signal a controller to which the sensor is coupled (e.g., the controller 141 of FIG. 1) to adjust operation of the electric machine in which the drainage system 300 is positioned. Additionally or alternatively, the sensor may signal the controller to adjust liquid flow, for example, by adjusting a pump flow rate of a pump to pump liquid through an oil circuit (e.g., the oil circuit 120 of FIG. 1). Further detail regarding adjustment of the electric machine and/or liquid flow based on detection of liquid in the drainage system 300 using a sensor is described with respect to FIG. 6.

When the seal 356 is degraded, liquid leaking through the seal into the interior 370 of the electric motor may be axially contained between the seal 356 and at least one of the annular lip 358 and the annular depression 360. The drainage system 300 may thus prevent liquid from flowing towards the electromagnetic active region of the electric motor (e.g., the rotor and the stator), which may prevent further degradation of the electric motor. The drainage system 300 may capture leaking liquid both when the rotor shaft 310 is rotating and is not rotating (e.g., stationary). Examples of liquid flow paths into the interior 370 of the electric motor and harvesting of liquid by the drainage system 300 are illustrated in FIGS. 4A-4B.

When the seal is degraded, liquid leaking through the seal into the interior of the electric motor may be contained axially between the seal and at least one of the radially projecting annular lip and the annular depression. Depending on a region of seal degradation (e.g., between the seal and the electric motor housing and/or between the seal and the rotor shaft) liquid may be directed along at least one of two liquid flow paths, as described in relation to FIGS. 4A-4B. Liquid is directed to a liquid overflow container (e.g., reservoir) or to the outside of the electric motor by the drain hole. Due to the use of both the radially projecting annular lip and the annular depression, liquid leaking through the seal may be harvested and directed both when the rotor shaft is rotating and is stationary. In this way, the drainage system directs the leak away from this interior of the electric motor, which may reduce further degradation to the electric motor and/or an electric drive system in which the electric motor is arranged, such as a high voltage short circuit in windings. A useable life of the electric motor and electric drive system may thus be prolonged.

Turning to FIGS. 4A-4B, examples of liquid flow paths are shown, which may be formed in the drainage system 300 shown in FIGS. 3A-3B. Elements of FIGS. 4A-4B which are associated with those described in relation to FIGS. 3A-3B are similarly numbered. Liquid leaking through the seal 356 may be captured and directed out of the interior 370 of the electric motor both when the rotor shaft 310 is rotating and when the rotor shaft 310 is stationary. FIG. 4A shows a first liquid flow path schematic 410, and FIG. 4B shows a second liquid flow path schematic 420. The first liquid flow path may occur when liquid (e.g., oil and/or a WEG mixture) leaks through the seal between the seal and the rotor shaft, and the second liquid flow path may occur when liquid leaks through the seal between the seal and the electric motor housing.

Each of FIGS. 4A-4B includes the axis system 250, where the negative direction of the y-axis indicates a direction of gravity such that, "the direction of gravity" described herein refers to the negative y-direction. As described above, the seal 356, the annular lip 358, and the annular depression 360 may be rotationally symmetrical about the rotational axis 316, and the drain hole 362 may be positioned at a lowermost point of the annular depression 360 with respect to the y-axis. In this way, the electric drive system 200 of FIG. 2 may be positioned differently than what is shown in FIG. 2, and the drainage system 300 may function to capture and direct liquid leaking through the shaft seal. For example, an orientation of the electric drive system 200 may be flipped across the y-z axis and/or across the z-x axis, with respect to the axis system 250, and the drain hole 362 may be positioned at a lowermost point of the annular depression 360 with respect to the y-axis. Thus, the drainage system 300 may capture and direct liquid leaking through the shaft seal as described herein when the electric drive system 200 is in a variety of orientations.

Returning to FIG. 4A, the seal 356 may be degraded on an inner diameter 386, such as between the seal 356 and the rotor shaft 310. Liquid may build up between the annular lip 358 and the seal 356, and the liquid may be projected towards the annular depression 360. If the liquid builds up slowly, such as when the rotor shaft 310 is not rotating (e.g., stationary), the liquid may build up at a tip of the annular lip 358 and be projected in a direction of gravity onto the annular depression 360 of the electric machine housing 207. If the liquid builds up quickly, such as when the rotor shaft 310 is rotating, the liquid may be projected up the first angled wall 358a of the annular lip 358 and onto the annular depression 360, as further described herein.

As briefly described above, FIG. 4A shows the first liquid flow path schematic 410, where liquid leaks through the inner diameter 386. The first liquid flow path schematic 410 includes a plurality of arrows 415a-415h, which may indicate the first liquid flow path. Liquid may leak through the seal 356 at the inner diameter 386, as shown by a first arrow 415a. As briefly described above, the retaining plate 353 may have an annular or ring shape with a gap 368 between the retaining plate 353 and the rotor shaft 310, thus allowing liquid leaking through the inner diameter 386 to flow axially along the rotor shaft 310. The liquid may build up between the annular lip 358 and the seal 356. For example, as the annular lip 358 has a triangular shape with the height 352a, as described with reference to FIG. 3B, a height of liquid building up between the seal 356 and the annular lip 358 may rise up the first angled wall 358a (e.g., proximate to the seal 356) and approach, but not equal or exceed, the height 352a. Alternatively, the annular lip 358 may have a shape other than the triangular shape (e.g., a first concave wall and a second concave wall which intersect to form a sharp tip), where liquid building up between the seal 356 and the annular lip may rise up the first concave wall.

As the first corner of the annular lip 358 and the first edge of the annular depression 360 are equidistant from the seal 356, and the annular lip 358 has the triangular shape extending circumferentially around the rotor shaft 310, liquid building up along the first angled wall 358a of the annular lip 358 may be projected radially (e.g., away from the rotational axis 316) towards the annular depression 360. When the rotor shaft 310 is not rotating (e.g., stationary), liquid building up between the seal 356 and the annular lip 358 at a portion of the rotor shaft 310 parallel to the rotational axis 316 may flow across the rotor shaft 310 in a direction of gravity (e.g., along the negative y-direction), as shown by a first dashed arrow 415b, which indicates liquid flow along the outer circumference of the rotor shaft 310, which is not visible in FIG. 4A.

When the rotor shaft 310 is rotating, at least some of the liquid may be projected up the first angled wall 358a of the annular lip 358 and into the annular depression 360, as shown by a second arrow 415c. Liquid may be projected by the annular lip 358 radially and axially, relative to the rotational axis 316. The liquid may thus be flung radially outwards by centrifugal force and be redirected by the annular depression 360 which, as described above, has axial, radial, and circumferential concavity (e.g., the first wall 360a and the second wall 360b curvedly connected to the base 364). A portion of the liquid may additionally flow across the rotor shaft 310 in a direction of gravity as shown by the first dashed arrow 415b when the rotor shaft 310 is rotating, depending on a rotational speed of the rotor shaft 310 and the corresponding centrifugal force. At some rotational speeds of the rotor shaft 310, which may be less than a rotational speed of the rotor shaft 310 at which a majority of the liquid is projected into the annular depression 360, at least some of the liquid may flow across the rotor shaft 310 in a direction of gravity (e.g., along the negative y-direction), as shown by the first dashed arrow 415b. As the electric machine housing 207 is stationary, liquid projected into the annular depression 360 flows along the base 364 of the annular depression 360 in the direction of gravity, as shown by a third arrow 415d. Liquid continues to flow in the direction of gravity in a lower region 405 of the annular depression 360 below the rotational axis 316, as indicated by a fourth arrow 415e, towards the drain hole 362.

In the case of liquid undesirably leaking through the seal, a flow rate of liquid through the seal may be sufficiently slow such that a majority of liquid leaking through the seal flows across the rotor shaft 310 in the direction of gravity as shown by the first dashed arrow 415b. A rotational speed of the rotor shaft 310 may not affect the angle at which liquid is projected into the annular depression 360 by the annular lip 358, due to the flow rate of liquid as described above. In other words, centrifugal force from rotation of the rotor shaft 310 may project liquid up the first angled wall 358a of the annular lip 358, and the angle at which liquid is projected from the annular lip 358 may be approximately equal when the rotor shaft 310 is rotating and when the rotor shaft 310 is stationary (e.g., when the rotor shaft 310 is perpendicular to the direction of gravity).

Liquid leaking through the seal 356 at the inner diameter 386 in the lower region 405 may similarly flow axially along the rotor shaft 310 (e.g., in the gap 368 between the retaining plate 353 and the rotor shaft 310), as shown by a fifth arrow 415f, and may be projected into the annular depression 360 by the annular lip 358, as shown by a sixth arrow 415g. Additionally or alternatively, liquid may drip from the annular lip 358 in a direction of gravity into the annular depression 360 and thus may not be projected at an angle onto the second wall 360b of the annular depression 360. Liquid collected by the annular depression 360 may flow out of the interior 370 of the electric motor via the drain hole 362, as shown by a seventh arrow 415h.

Additionally or alternatively, the seal 356 may be degraded on an outer diameter of the seal 356, such as in a static region 384 between the seal 356 and the electric machine housing 207. The second liquid flow path schematic 420, as shown in FIG. 4B, includes a plurality of arrows 425*a*-425*e*, which may indicate the second liquid flow path. Liquid flowing through the static region 384 (e.g., an external diameter) may be harvested by the annular depression 360 and directed towards the drain hole 362 as shown by the second liquid flow path schematic 420 both when the rotor shaft 310 is rotating and is stationary.

Liquid may leak through the seal 356 at the static region 384, as shown by an eighth arrow 425*a*. The liquid may flow along the electric machine housing 207 and into the annular depression 360, which is curvedly coupled to (e.g., a concave channel of) the electric machine housing 207 at the first wall 360*a*. As the annular depression 360 is a concave channel in the electric machine housing 207, liquid may flow in the direction of gravity, as shown by a ninth arrow 425*b* and a tenth arrow 425*c*, along the base 364 of the annular depression 360. In the lower region 405, liquid leaking through the seal 356 at the static region 384 may flow along the electric machine housing 207, as shown by an eleventh arrow 425*d*, and into the annular depression 360, as shown by twelfth arrow 425*e*. Liquid collected by the annular depression 360 may flow out of the interior 370 of the electric motor via the drain hole 362, as shown by a thirteenth arrow 425*f*. In this way, the drainage system 300 may be used both when the rotor shaft 310 is stationary and when the rotor shaft 310 is rotating to harvest liquid leaking through the seal at the static region and/or the inner diameter, and direct the liquid out of the interior of the electric motor.

FIG. 5 illustrates a method 500 for operating an electric drive system 102, including capturing liquid leaking through a seal using the drainage system described herein. The method 500 may be described with respect to the drainage system 300, as described with respect to FIGS. 3-4B, however it should be understood that similar methods may be used with other systems without departing from the scope of this disclosure. Instructions for carrying out elements of method 500 may be executed by a controller (such as controller 141 of FIG. 1) based on instructions stored on a memory of the controller and in conjunction with signals received from sensors of the system, such as the sensors described above with reference to FIG. 1. The controller may employ actuators of the system to adjust motor operation, according to the methods described below.

At 502, the method 500 includes rotating a shaft. The shaft may be the rotor shaft 310, which may be rotated during operation of an electric motor (e.g., the electric machine 206) to generate power used to propel or otherwise provide power to the vehicle (e.g., the vehicle 100 of FIG. 1). The shaft may be rotated at variable speeds, which may be dependent on a power demand from a vehicle user and/or from the controller (e.g., the controller 141 of FIG. 1). Liquid lubricant, such as oil, a WEG mixture, or another lubricant may be used to lubricate components of the electric machine on the exterior of the electric machine. The rotor shaft seal, or another type of seal used to separate the interior of the electric motor from the exterior of the electric motor, may be degraded over time due to vibration, heating, or other degradation. Degradation of the seal may allow lubricant (e.g., liquid) to leak through the seal from the exterior of the electric motor into the interior of the electric motor. A presence of liquid in the interior of the electric motor may further degrade additional components of the electric motor, such as the rotor, the stator, windings, and so on, which may result in insufficient power generation by the electric machine. Additionally or alternatively, if the liquid is conductive, the presence of liquid in the interior of the electric motor may create a short circuit on high-voltage parts, which may cause unexpected breaking torque and/or torque ripple which may lead to undesirable vehicle operation.

The method 500 includes passive collection of liquid by the drainage system, and may not include use of the controller to control liquid flow. At 504, the method 500 includes driving liquid lubricant (e.g., leaking through the seal into the interior of the electric motor) via an angled, annular projection of the shaft. For example, the angled, annular projection may be the annular lip 358. As described with respect to FIGS. 4A-4B, liquid may flow axially along the rotor shaft into the interior of the electric motor. Centrifugal force generated by rotation of the shaft may drive liquid up the first angled wall of the annular lip. The liquid may be projected at a less than 90-degree angle (e.g., radially and axially) towards the second wall of the annular depression.

At 506, the method 500 may include capturing the driven liquid via a channel in a housing of the electric motor. The channel may be the annular depression 360, as described with respect to FIGS. 3-4B. As previously described, the liquid may be driven by the angled, annular projection of the rotor shaft (the annular lip) towards the second wall of the annular depression. As the first corner of the annular lip 358 and the first wall of the annular depression 360 are in radial alignment, and the width of the annular lip 358 is less than the width of the annular depression, as described with respect to FIG. 3B, projection of liquid by the annular lip allows the liquid to be captured by the annular depression instead of the liquid being projected further into the interior of the electric motor. The captured liquid may flow along the circumference of the annular depression (e.g., radially about the rotor shaft in the annular depression) in a direction of gravity, as the annular depression (and the housing) remain stationary when the rotor shaft is rotating.

At 508, the method 500 includes directing captured liquid out of the channel via the drain hole. As described above, the drain hole may be positioned at a lowest point of the channel with respect to a direction of gravity. Thus, when liquid is directed along the circumference of the annular depression in the direction of gravity, the liquid may be directed out of the channel via at least one drain hole. In this way, liquid leaking through the seal into the interior of the electric motor may be captured and directed out of the interior of the electric motor by the annular lip and the annular depression of the drainage system.

The drainage system may optionally include elements which alert a control system coupled to the drainage system and/or the electric motor of liquid leaking into the interior of the electric motor. Responsive to detection of liquid leaking into the interior of the electric motor, the controller may halt or alter operation of the electric motor until the seal which is degraded is repaired or replaced. FIG. 6 illustrates a method 600 for operating an electric drive system 102, including adjusting motor operation and/or liquid flow based on detection of liquid in the drainage system described herein. The method 600 may be optionally implemented in electric drive systems having the drainage system 300. The method 600 may be described with respect to the drainage system 300, as described with respect to FIGS. 3A-4B, however it should be understood that similar methods may be used with other systems without departing from the scope of this disclosure. Instructions for carrying out method 600 may be executed by a controller (such as controller 141 of FIG. 1) based on instructions stored on a memory of the controller and in conjunction with signals received from sensors of the system, such as the sensors described above with reference to FIG. 1. The controller may employ actuators of the system to adjust motor operation, according to the methods described below.

As briefly described with respect to FIGS. 3A-3B, in some embodiments, a sensor (not shown) for detecting a presence of liquid may be positioned in at least one of the annular depression 360, the drain hole 362, and/or the reservoir. For example, a sensor may be positioned in one of the annular depression 360, the drain hole 362, or the reservoir, or a sensor may be positioned in each of the annular depression 360, the drain hole 362, and the reservoir. The sensor(s) may be communicatively coupled to the controller via a wired or a wireless coupling. The sensor may detect a level of liquid and/or a presence or absence of liquid.

At 601, the method 600 includes estimating and/or measuring current vehicle and engine operating conditions, including, for example, operator torque demand, engine speed, vehicle speed, engine coolant temperature (ECT), engine head temperature (EHT), engine load, ambient conditions (such as ambient humidity, temperature, and barometric pressure), volume of oil in a reservoir, and so on.

At 602, the method 600 includes determining if liquid is present in the drainage system. Liquid may be present when the seal is degraded and liquid is leaking through the seal at the static region between the seal and the motor housing and/or the inner diameter between the seal and the rotor shaft. When a sensor is positioned in the annular depression, it may be determined that liquid is present in the drainage system when liquid is detected in the annular depression, such as liquid which has been projected from the annular lip and captured by the annular depression. When a sensor is positioned in the drain hole, it may be determined that liquid is present in the drainage system when liquid is flowing through the drain hole to the exterior of the electric motor and/or to a reservoir (e.g., liquid flowing from the annular depression into the drain hole). When a sensor is positioned in the reservoir (e.g., liquid overflow container), detection of liquid above a threshold liquid level may indicate a presence of liquid in the drainage system. The threshold liquid level may include a non-zero volume of liquid retained in the reservoir during operation of the pump to pump oil through the oil circuit.

If it is determined that liquid is not present in the drainage system, at 604, the method 600 includes maintaining nominal electric motor operation and liquid flow.

If it is determined that liquid is present in the drainage system, at 606, the method 600 includes adjusting at least one of motor operation and liquid flow. Adjusting motor operation may include reducing or halting operation of the electric motor for a duration. For example, power output by the electric motor may be reduced to less than (e.g., 50% of) nominal power output. In another example, the electric motor may be turned off. Motor operation may be adjusted for a set duration of time, or may be adjusted until the sensor detects no liquid in the drainage system. This may reduce degradation to the interior of the electric motor. Adjusting liquid flow may include turning off or adjusting a flow pump rate of an oil pump, such that the oil flow rate is decreased or halted. Liquid flow may be reduced and an amount of liquid leaking into the interior of the electric motor may be reduced, which may prevent further reduction of the useable life of the electric motor due to liquid in the interior of the electric motor.

If it is determined that liquid is present in the drainage system, method 600 may include indicating liquid detection in the drainage system, which may include indication of at least one of degradation of a rotor shaft seal, adjustment of motor operation, and adjustment of liquid flow. Indication of liquid detection in the drainage system may include displaying a notification at, for example, a dashboard user interface of the vehicle. This may indicate that replacement or repair of the rotor shaft seal is desired.

An amount of liquid in the drainage system, and therefore in the interior of the electric motor, may be decreased due to adjustment of at least one of motor operation and/or liquid flow. Liquid may be present in the interior of the electric motor so long as the liquid is being used to lubricate and/or cool the electric motor and while the seal is degraded. Liquid may be temporarily absent from the interior of the electric motor when liquid flow is adjusted such that liquid is not being pumped throughout the oil circuit, for example. Following repair or replacement of the seal which is degraded may reestablish fluidic separation of the interior of the electric motor from the exterior of the electric motor, such that liquid may be prevented from leaking into the interior of the electric motor by the seal.

Following adjustment of motor operation and/or liquid flow, the method 600 may return to 602 to determine if liquid is present in the drainage system. If liquid is present, the method 600 returns to 606, and the adjustment made to motor operation and/or liquid flow may be maintained or motor operation and/or liquid flow may be further adjusted. If liquid is not present, the method 600 may proceed to 604 to adjust to nominal electric motor operation and liquid flow.

The drainage system described herein provides an efficient architecture for harvesting liquid which may leak through a seal separating an interior and an exterior of an electric motor when the seal is degraded. Liquid leaking through the seal may be harvested and directed away from the interior of the electric motor both when the rotor shaft is rotating and is stationary. An annular lip of the rotor shaft and an annular depression of the electric motor housing may contain and/or project liquid towards a drain hole, which further directs liquid away from the interior of the electric motor. The annular lip is machined as part of the rotor shaft and the annular depression is machined as a convex channel in the electric motor housing. Thus, the drainage system comprises no additional parts compared to a conventional electric motor, which may reduce a complexity of the drainage system compared to other proposed drainage systems. In this way, liquid which may leak through a seal when the seal is degraded may be prevented from entering elements of the interior of the electric motor, such as the rotor and the stator, and may thus reduce degradation to the electric motor when the seal is degraded.

The technical effect of the drainage system is that liquid leaking through a degraded rotating shaft seal within an electric motor may be harvested both during rotor shaft rotation and when the rotor shaft is stationary without the inclusion of additional electric machine components.

The disclosure also provides support for a drainage system, comprising: a rotating shaft with an annular tip extending radially from the rotating shaft, and a housing with an annular depression circumferentially surrounding the rotating shaft, such that liquid flowing up a first angled wall of the annular tip is projected at an angle to a first wall of the annular depression, which guides the liquid to a base of the annular depression and along a circumference of the annular depression to exit the annular depression at a drain hole coupled to the annular depression. In a first example of the system, the annular depression is a uniform concave channel circumferentially surrounding the annular tip. In a second example of the system, optionally including the first example, the annular depression has a first depth extending radially into the housing and a first width greater than a width of the annular tip. In a third example of the system, optionally including one or both of the first and second examples, a diameter of the rotating shaft is equivalent on a left side and a right side of the annular tip. In a fourth example of the system, optionally including one or more or each of the first through third examples, the base of the annular depression is positioned between and curvedly coupled to each of the first wall and a second wall of the annular depression, and the base is radially spaced a non-zero distance from the annular tip. In a fifth example of the system, optionally including one or more or each of the first through fourth examples, a left corner of the annular tip is in radial alignment with the second wall of the annular depression. In a sixth example of the system, optionally including one or more or each of the first through fifth examples, the first angled wall of the annular tip forms a less than 90-degree angle with the rotating shaft. In a seventh example of the system, optionally including one or more or each of the first through sixth examples, a second angled wall is coupled to the first angled wall to form a tip of the annular tip which extends radially from the rotating shaft.

The disclosure also provides support for an electric motor, comprising: a first region cooled by a liquid, a seal separating the first region from a second region, wherein the liquid does not enter the second region when the seal is not degraded, and a drainage system configured to drain liquid leaking through the seal from the first region into the second region, the drainage system comprising a radially projecting annular lip with a first angled wall positioned on a rotor shaft and an annular depression in a motor static housing circumferentially surrounding the radially projecting annular lip. In a first example of the system, the drainage system is positioned in the second region. In a second example of the system, optionally including the first example, the annular depression is a semi-circular concave channel in the motor static housing, and includes a drain hole which couples the annular depression to a liquid overflow container or an exterior of the electric motor. In a third example of the system, optionally including one or both of the first and second examples, the first angled wall forms a less than 90-degree angle with the rotor shaft. In a fourth example of the system, optionally including one or more or each of the first through third examples, the first angled wall is coupled to a second angled wall positioned on the rotor shaft, such that the first angled wall and the second angled wall intersect to form the radially projecting annular lip. In a fifth example of the system, optionally including one or more or each of the first through fourth examples, a first distance between a first corner of the first angled wall and the seal is equal to a second distance between a first wall of the annular depression and the seal, such that the first corner of the first angled wall and the first wall of the annular depression are in radial alignment. In a sixth example of the system, optionally including one or more or each of the first through fifth examples, the first corner of the first angled wall and the first wall of the annular depression are aligned along a vertical axis perpendicular to an axis of rotation of the rotor shaft. In a seventh example of the system, optionally including one or more or each of the first through sixth examples, a base width of the radially projecting annular lip formed by the first angled wall and the second angled wall is less than a width of the annular depression. In an eighth example of the system, optionally including one or more or each of the first through seventh examples, the radially projecting annular lip has a first height extending radially from the rotor shaft and the annular depression has a first depth extending radially into the motor static housing with a non-zero distance between the radially projecting annular lip and a base of the annular depression.

The disclosure also provides support for a method for an electric motor, comprising: rotating a shaft, driving liquid via an angled, annular projection of the shaft, capturing driven liquid via a channel in a housing of the electric motor, and directing liquid out of the channel via a drain hole. In a first example of the method, a first portion of liquid is driven up a first side of the angled, annular projection by centrifugal force generated by rotating the shaft, and projected radially and at a less than 90-degree angle into the channel and a second portion of liquid is captured via the channel without being driven by the angled, annular projection when liquid is flowing between the housing and a shaft seal. In a second example of the method, optionally including the first example, the method further comprises: detecting liquid in at least one of the channel and the drain hole using a sensor positioned therein, and adjusting at least one of electric motor operation and liquid flow when liquid is present in at least one of the channel and the drain hole.

FIGS. 2-4B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A drainage system, comprising:
   a rotating shaft with an annular tip extending radially from the rotating shaft; and
   a housing with an annular depression circumferentially surrounding the rotating shaft, such that liquid flowing up a first angled wall of the annular tip is projected at an angle to a first wall of the annular depression, which guides the liquid to a base of the annular depression and along a circumference of the annular depression to exit the annular depression at a drain hole coupled to the annular depression, and wherein the base of the annular depression is positioned between and curvedly coupled to each of the first wall and a second wall of the annular depression, and the base is radially spaced a non-zero distance from the annular tip.

2. The drainage system of claim 1, wherein the annular depression is a uniform concave channel circumferentially surrounding the annular tip.

3. The drainage system of claim 1, wherein the annular depression has a first depth extending radially into the housing and a first width greater than a width of the annular tip.

4. The drainage system of claim 1, wherein a diameter of the rotating shaft is equivalent on a left side and a right side of the annular tip.

5. The drainage system of claim 1, wherein a left corner of the annular tip is in radial alignment with the second wall of the annular depression.

6. The drainage system of claim 1, wherein the first angled wall of the annular tip forms a less than 90-degree angle with the rotating shaft.

7. The drainage system of claim 1, wherein a second angled wall is coupled to the first angled wall to form a tip of the annular tip which extends radially from the rotating shaft.

8. An electric motor, comprising:
   a first region cooled by a liquid;
   a seal separating the first region from a second region, wherein the liquid does not enter the second region when the seal is not degraded; and
   a drainage system configured to drain liquid leaking through the seal from the first region into the second region, the drainage system comprising a radially projecting annular lip with a first angled wall positioned on a rotor shaft and an annular depression in a motor static housing circumferentially surrounding the radially projecting annular lip, and wherein the annular depression is a semi-circular concave channel in the motor static housing, and includes a drain hole which couples the annular depression to a liquid overflow container or an exterior of the electric motor.

9. The electric motor of claim 8, wherein the drainage system is positioned in the second region.

10. The electric motor of claim 8, wherein the first angled wall forms a less than 90-degree angle with the rotor shaft.

11. The electric motor of claim 8, wherein the first angled wall is coupled to a second angled wall positioned on the rotor shaft, such that the first angled wall and the second angled wall intersect to form the radially projecting annular lip.

12. The electric motor of claim 11, wherein a first distance between a first corner of the first angled wall and the seal is equal to a second distance between a first wall of the annular depression and the seal, such that the first corner of the first angled wall and the first wall of the annular depression are in radial alignment.

13. The electric motor of claim 12, wherein the first corner of the first angled wall and the first wall of the annular depression are aligned along a vertical axis perpendicular to an axis of rotation of the rotor shaft.

14. The electric motor of claim 11, wherein a base width of the radially projecting annular lip formed by the first angled wall and the second angled wall is less than a width of the annular depression.

15. The electric motor of claim 11, wherein the radially projecting annular lip has a first height extending radially from the rotor shaft and the annular depression has a first depth extending radially into the motor static housing with a non-zero distance between the radially projecting annular lip and a base of the annular depression.

16. A method for an electric motor, comprising:
   rotating a shaft;
   driving liquid via an angled, annular projection of the shaft;
   capturing driven liquid via a channel in a housing of the electric motor;
   directing liquid out of the channel via a drain hole; and
   detecting liquid in at least one of the channel and the drain hole using a sensor positioned therein; and
   adjusting at least one of electric motor operation and liquid flow when liquid is present in at least one of the channel and the drain hole.

17. The method of claim 16, wherein a first portion of liquid is driven up a first side of the angled, annular projection by centrifugal force generated by rotating the shaft, and projected radially and at a less than 90-degree angle into the channel and a second portion of liquid is captured via the channel without being driven by the angled, annular projection when liquid is flowing between the housing and a shaft seal.

* * * * *